United States Patent [19]

Ewen

[11] Patent Number: 4,794,096
[45] Date of Patent: Dec. 27, 1988

[54] HAFNIUM METALLOCENE CATALYST FOR THE POLYMERIZATION OF OLEFINS

[75] Inventor: John A. Ewen, Houston, Tex.

[73] Assignee: Fina Technology, Inc., Dallas, Tex.

[21] Appl. No.: 96,075

[22] Filed: Sep. 11, 1987

Related U.S. Application Data

[63] Continuation-in-part of Ser. No. 34,341, Apr. 3, 1987, abandoned.

[51] Int. Cl.$^4$ .............................................. C08F 4/64
[52] U.S. Cl. .................................... 502/117; 526/153; 526/160
[58] Field of Search ........................................ 502/117

[56] References Cited

U.S. PATENT DOCUMENTS

| | | | |
|---|---|---|---|
| 4,404,344 | 9/1983 | Sinn et al. | 252/431 R |
| 4,411,821 | 10/1983 | Howard, Jr. | 502/117 |
| 4,497,906 | 2/1984 | Hanji et al. | 502/117 X |
| 4,522,982 | 6/1985 | Ewen | 525/240 |
| 4,530,914 | 7/1985 | Ewen | 502/117 X |
| 4,542,199 | 9/1985 | Kaminsky et al. | 502/117 X |
| 4,665,047 | 5/1987 | Slaugh | 502/117 X |

FOREIGN PATENT DOCUMENTS

| | | | |
|---|---|---|---|
| 0129368 | 12/1984 | European Pat. Off. | |
| 0128045 | 12/1984 | European Pat. Off. | |
| 0128046 | 12/1984 | European Pat. Off. | |
| 0185918 | 7/1986 | European Pat. Off. | 502/117 |
| 0197319 | 10/1986 | European Pat. Off. | |
| WO87/0299 | 5/1987 | PCT Int'l Appl. | |
| WO87/03604 | 6/1987 | PCT Int'l Appl. | |

OTHER PUBLICATIONS

Basel, "Olefin Polymerization with Highly Active Soluble Zirconium Compounds Using Aluminoxane as Co-Catalyst," Die Makromolekulare Chemie/Macromolecular Symposia, Jun. 3, 1986, Switzerland, pp. 377-387.

Kaminsky, "Stereoselektive Polymerization von Olefinen mit Homogenen, Chiralen Ziegler-Natta-Katalysatoren," 145/146, 1986, pp. 149-160.

John A. Ewen, "Mechanisms of Stereochemical Control in Propylene Polymerizations with Soluble Group 4B Metallocene/Methylalumoxane Catalysts", Journal of the American Chemical Society, vol. 106, No. 21, 1984, pp. 6355-6364.

John A. Ewen, "Catalytic Polymerization of Olefins", Proceedings of the International Symposium on Future Aspects of Olefin Polymerization, 1986, pp. 271-292.

Primary Examiner—Patrick P. Garvin
Attorney, Agent, or Firm—John K. Abokhair; Stuart L. Watt; M. Norwood Cheairs

[57] ABSTRACT

The present invention provides a catalyst system for the polymerization and copolymerization of olefins with the system comprising a chiral, stereorigid hafnium metallocene catalyst in combination with an aluminum compound. The aluminum compound is preferably an alumoxane and may be a mixture of alumoxane and trimethyl aluminum. It was discovered that this mixture causes a transformation of the catalyst over time. The catalyst system may also include a solvent to increase the solubility of the metallocene catalyst. It was discovered that these catalyst systems produce useful polymer products with molecular weights greater than 10,000.

8 Claims, 1 Drawing Sheet

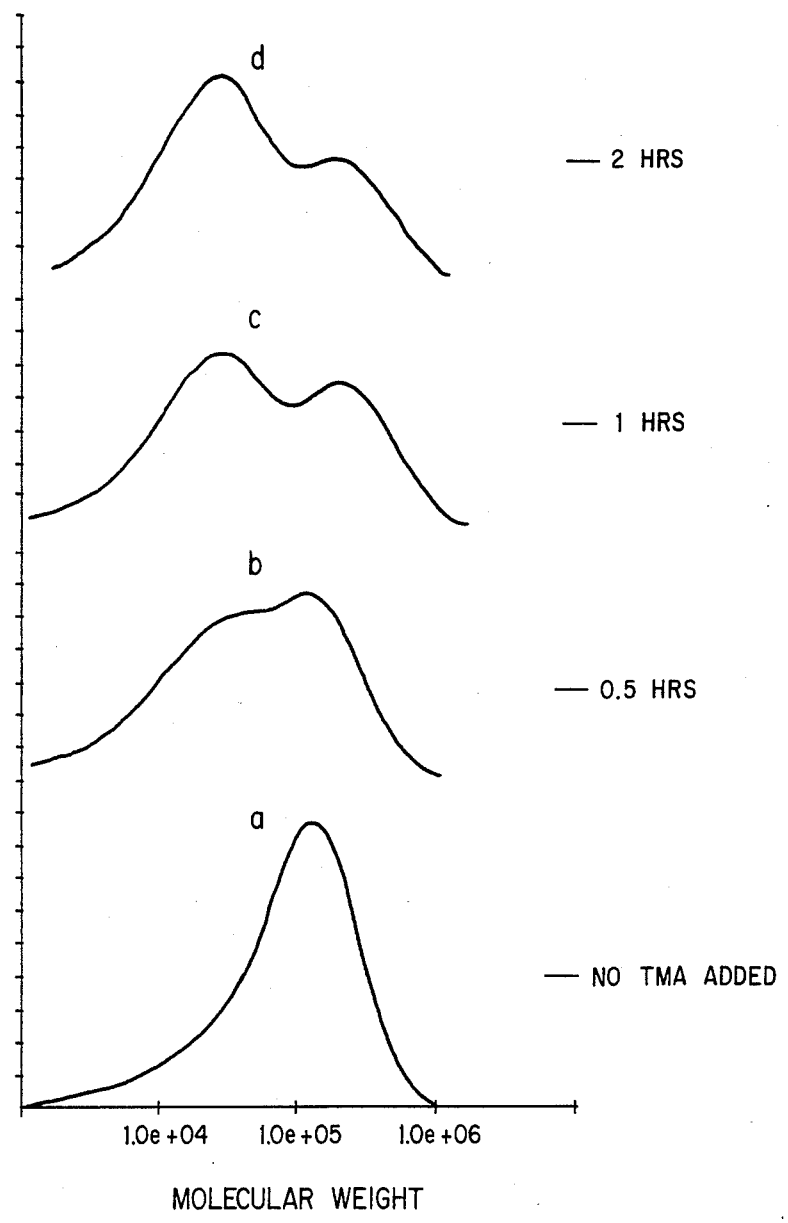
FIGURE

HAFNIUM METALLOCENE CATALYST FOR THE POLYMERIZATION OF OLEFINS

This is a continuation-in-part of application Ser. No. 034,341 filed on Apr. 3, 1987 and now abandoned.

TECHNICAL FIELD

The present invention relates to a catalyst system for the polymerization and copolymerization of olefins with the system comprising a chiral, stereorigid hafnium metallocene catalyst in combination with an aluminum compound. It has been discovered that these catalyst systems produce useful polymer products with molecular weights greater than 10,000.

BACKGROUND OF THE INVENTION

The present invention provides a hafnium metallocene catalyst useful in the polymerization of olefins, particularly propylene and higher alpha-olefins, and in the copolymerization of olefins, especially ethylene and propylene.

The use of metallocenes as catalysts for the polymerization of ethylene is known in the art. German patent application No. 2,608,863 discloses a catalyst system for the polymerization of ethylene consisting of bis(cyclopentadienyl)titanium dialkyl, an aluminum trialkyl and water. German patent application No. 2,608,933 discloses an ethylene polymerization catalyst system consisting of zirconium metallocenes of the general formula (cyclopentadienyl)$_n$ Zr Y$_{4-n}$, wherein Y represents R$_1$CH$_2$AlR$_2$, CH$_2$CH$_2$AlR$_2$ and CH$_2$CH (AlR$_2$)$_2$ where R stands for an alkyl or metallo alkyl, and n is a number within the range 1–4; and the metallocene catalyst is used in combination with an aluminum trialkyl cocatalyst and water.

The use of metallocenes as catalysts in the copolymerization of ethylene and other alpha-olefins is also known in the art. U.S. Pat. No. 4,542,199 to Kaminsky, et al. discloses a process for the polymerization of olefins and particularly for the preparation of polyethylene and copolymers of polyethylene and other alpha-olefins. The disclosed catalyst system includes a catalyst of the formula (cyclopentadienyl)$_2$MeRHal in which R is a halogen, a cyclopentadienyl or a C$_1$-C$_6$ alkyl radical, Me is a transition metal, in particular zirconium, and Hal is a halogen, in particular chlorine. The catalyst system also includes an alumoxane having the general formula Al$_2$OR$_4$(Al(R)-O)$_n$ for a linear molecule and/or (Al(R)-O)$_{n+2}$ for a cyclic molecule in which n is a number from 4–20 and R is a methyl or ethyl radical. A similar catalyst system is disclosed in U.S. Pat. No. 4,404,344.

U.S. Pat. No. 4,530,914 discloses a catalyst system for the polymerization of ethylene to polyethylene having a broad molecular weight distribution and especially a bimodal or multimodal molecular weight distribution. The catalyst system is comprised of at least two different metallocenes and an alumoxane. The patent discloses metallocenes that may have a bridge between two cyclopentadienyl rings with the bridge serving to make those rings stereorigid.

European Patent Publication No. 0185918 discloses a stereorigid, chiral zirconium metallocene catalyst for the polymerization of olefins. The application does not indicate that hafnium could be substituted for the zirconium and used to produce a useful polymer product. The bridge between the cyclopentadienyl groups is disclosed as being a linear hydrocarbon with 1–4 carbon atoms or a cyclical hydrocarbon with 3–6 carbon atoms.

It is known by those skilled in the art that polyolefins, and principally polypropylene, may be produced in various forms: isotactic, syndiotactic, atactic and isotactic-atactic stereoblock. Isotactic polypropylene contains principally repeating units with identical configurations and only a few erratic, brief inversions in the chain. Isotactic polypropylene may be structurally represented as

(I)

Isotactic polypropylene is capable of forming a highly crystalline polymer with crystalline melting points and other desirable physical properties that are considerably different from the same polymer in an amorphous, or noncrystalline, state.

A syndiotactic polymer contains principally units of exactly alternating configurations and is represented by the structure

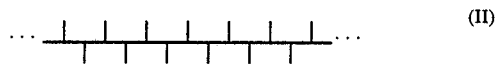

(II)

A polymer chain showing no regular order of repeating unit configurations is an atactic polymer. In commercial applications, a certain percentage of atactic polymer is typically produced with the isotactic form. A polymer with recurring units of opposite configuration is an isotactic stereoblock polymer and is represented by

(III)

This latter type, the stereoblock polymer, has been successfully produced with metallocene catalysts as described in U.S. Pat. No. 4,522,982.

A system for the production of isotactic polypropylene using a titanium or zirconium metallocene catalyst and an alumoxane cocatalyst is described in "Mechanisms of Stereochemical Control in Propylene Polymerization with Soluble Group 4B Metallocene/Methylalumoxane Catalysts," J. Am. Chem. Soc., Vol. 106, pp. 6355–64, 1984. The article shows that chiral catalysts derived from the racemic enantiomers of ethylene-bridged indenyl derivatives form isotactic polypropylene by the conventional structure predicted by an enantiomorphic-site stereochemical control model. The meso achiral form of the ethylene-bridged titanium indenyl diastereomers and achiral zirconocene derivatives, however, produce polypropylene with a purely atactic structure.

The above references generally describe metallocene catalysts as having two cyclopentadienyl rings attached to a transition metal. This general description would include a hafnium metallocene, but prior to the present invention, the references have disclosed only titanium and zirconium metallocene catalysts that prove to be of any use. Heretofore, hafnium metallocene catalysts have not produced useful polypropylene products, in particular, as the molecular weights of the products have been well below 10,000. Hafnium could not simply be substituted for zirconium or titanium in known metallocene systems and produce useful results.

The present invention includes the discovery of a new type of hafnium metallocene catalyst not taught by the prior art. The catalyst exhibits properties and produces results that surpass those exhibited by zirconium and titanium metallocene catalysts with similar structures and used under similar conditions.

SUMMARY OF THE INVENTION

The present invention provides catalyst systems for the polymerization of olefins that include a chiral, stereorigid hafnium metallocene catalyst described by the formula $R''(C_5(R')_4)_2HfQ_p$ and an aluminum compound; wherein $(C_5(R')_4)$ is a cyclopentadienyl or substituted cyclopentadienyl ring; R' is hydrogen or a hydrocarbyl radical having from 1 to 20 carbon atoms, each R' may be the same or each may be different; R'' is an organic or inorganic group providing a structural bridge between the two $(C_5(R')_4)$ rings imparting stereorigidity to said catalysts; Q is a hydrocarbon radical such as an aryl, alkyl, alkenyl, alkylaryl or arylalkyl radical having 1-20 carbon atoms or is a halogen; and $0 \leq p \leq 3$.

Hafnium metallocene catalysts as described by the present invention are stereospecific and produce polymers with higher molecular weights than were previously known with metallocene catalysts. The molecular weights are consistently above 10,000. These polymers are also highly stereoregular, have high crystalline melting points, and high optical activity. The catalysts of the present invention also show high efficiencies.

The hafnium metallocene catalysts of the present invention may also be used in the copolymerization of polyolefins, especially propylene and ethylene.

Also included in the present invention is the discovery of the effect of a mixture of alumoxane and trimethyl aluminum on a hafnium metallocene catalyst. A mixture of alumoxane and trimethyl aluminum causes a transformation of the catalyst over time. The transformed catalyst produces a polymer product with a low molecular weight and a relatively narrow distribution. The new catalyst retains, however, the same degree of stereoregularity as the original form of the catalyst.

In another embodiment of the invention, a solvent is added to the catalyst system to increase the solubility of the catalyst in a solution of olefin(s). A preferred solvent is toluene, xylene or methylene chloride.

DESCRIPTION OF THE FIGURE

The Figure shows the influence of trimethylaluminum on a hafnium metallocene of the formula Et-$(Ind)_2HfCl_2$ when used in combination with alumoxane. The Figure illustrates the formation of a bimodal distribution with time.

DETAILED DESCRIPTION

The invention provides a hafnium metallocene catalyst system for the polymerization and copolymerization of olefins that provides a more useful product with higher molecular weights than was achievable with previously disclosed hafnium catalysts. The hafnium metallocenes also produce polymers that are more highly stereoregular and have higher molecular weights than the analogous zirconium metallocene catalysts. These and other beneficial advantages of the present invention will become more apparent from the following detailed description and accompanying examples.

The hafnium catalyst of the present invention may be described by the following formula:

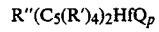

wherein $(C_5(R')_4)$ is a cyclopentadienyl or substituted cyclopentadienyl group; R' is hydrogen or a hydrocarbyl radical having from 1 to 20 carbon atoms, each R' may be the same or different; R'' is an organic or inorganic group at least a portion of which acts as a bridge between the two $(C_5(R')_4)$ groups thereby making the catalyst stereorigid; Q is a hydrocarbon radical such as an alkyl, aryl, alkenyl, alkylaryl or arylalkyl radical having 1-20 carbon atoms or is a halogen; and $0 \leq p \leq 3$. The catalyst should be chiral—i.e., non-superimposable on its mirror image—for the polymerization of propylene and higher alpha-olefins but need not be chiral or stereorigid for the polymerization of ethylene or predominantly ethylene copolymers.

Exemplary hydrocarbyl radicals that may form a part of the catalyst as described above are methyl, ethyl, propyl, butyl, amyl, isoamyl, hexyl, isobutyl, heptyl, octyl, nonyl, decyl, cetyl, phenyl, methylene, ethylene, propylene and the like. Exemplary halogen atoms include chlorine, bromine and iodine with chlorine being preferred. Q is preferably a halogen and p is preferably 2. The R' substituents are preferably selected such that $(C_5(R')_4)$ forms an indenyl radical (Ind) which may be hydrated $(IndH_4)$. As indicated, other hydrocarbon groups may be added to the cyclopentadienyl rings.

R'' is a stable component that bridges the two $(C_5(R')_4)$ rings in order to render the catalyst stereorigid. R'' may be organic or inorganic and may include groups depending from the portion acting as a bridge. Examples of R'' include an alkylene radical having 1-4 carbon atoms, a silicon hydrocarbyl group, a germanium hydrocarbyl group, an alkyl phosphine, an alkyl amine, boron, nitrogen, sulfur, phosphorous, aluminum or groups containing these elements. The preferred R'' components are methylene ($-CH_2-$), ethylene ($-C_2H_4-$), an alkyl silicon, and a cycloalkyl silicon such as cyclopropyl silicon, among others. The present invention is such that the R'' bridge and the R' substituents may be varied to provide polymer products with different properties.

In the present invention, the hafnium metallocene catalysts just described are used in combination with an aluminum compound. Preferably, the aluminum compound is an alumoxane represented by the general formula (R-Al-O) for the cyclic form and $R(R-Al-O-)_nAlR_2$ for the linear form. In the general formula, R is an alkyl group with 1-5 carbons and n is an integer from 1 to about 20. Most preferably, R is a methyl group. Generally, in the preparation of alumoxanes from, for example, trimethyl aluminum and water, a mixture of the linear and cyclic compounds is obtained.

The alumoxanes can be prepared in various ways. Preferably, they are prepared by contacting water with a solution of trialkyl aluminum, such as, for example, trimethyl aluminum, in a suitable solvent such as benzene. Most preferably, the alumoxane is prepared in the presence of a hydrated copper sulfate as described in U.S. Pat. No. 4,404,344 the disclosure of which is hereby incorporated by reference. This method comprises treating a dilute solution of trimethyl aluminum in, for example, toluene with copper sulfate represented by the general formula $CuSO_4.5H_2O$. The reaction is evidenced by the production of methane.

As part of the present invention, it was discovered that the use of a mixture of trimethyl aluminum and alumoxane in combination with a hafnium metallocene catalyst as described by the present invention caused a transformation of the catalyst. Alumoxane, containing only trace amounts of trimethyl aluminum (TMA), and the hafnocene catalyst produced a polymer product with fairly high molecular weights and that exhibited a fairly symmetrical distribution. (See Figure, curve a). The addition of about 1 mmol of TMA to 16 mmol of alumoxnne caused a transformation of the catalyst over a period of 2 hours. A new catalyst was formed that produced a polymer with a lower molecular weight and a narrow distribution but with the same degree of stereoregularity as the original species. (Figure, curves "b-d"). As the polymerization proceeds for a longer period of time, the distributions increase at the lower molecular weight peak. This increase over time is shown in the Figure.

Also included in the present invention is the use of a solvent to increase the solubility of the catalyst in the monomer. In a preferred embodiment, the metallocene catalyst is used in a liquid form as is the olefin monomer. The solvent may be premixed with the catalyst or added with the monomer. The preferred solvents include toluene, xylene, and methylene chloride, but the solvent can be any organic solvent. As the catalysts usually are somewhat polar, it is preferred that the solvents exhibit some degree of polarity. Depending on the catalyst, a particular solvent may be more compatible with a particular catalyst than other solvents.

The hafnium metallocene catalysts of the present invention may be produced using any of the methods known to those skilled in the art. Typically, the procedures simply comprise the addition of an HfQ group as described above and a R″ group to a starting compound such as indene or some other substituted dicyclopentadiene. An example of the production of the hafnium metallocenes as used in the Examples below is included in Example 1.

The polymerization procedures useful with the catalysts of the present invention include any procedures known in the art. An example of a preferred procedure would be that disclosed in copending application Ser. No. 009,712, filed Feb. 2, 1987 and now U.S. Pat. No. 4,767,735, hereby incorporated by reference which describes a prepolymerization of the catalyst before introducing the catalyst into a polymerization reaction zone. Another preferred procedure is illustrated in the Examples below.

The following Examples illustrate the present invention nnd its various advantages in more detail. Included with the Examples of hafnium catalysts are Comparative Examples using a zirconium metallocene catalyst to illustrate the increases in molecular weights and other polymer properties. The results are summarized in Table 1.

EXAMPLE 1

Preparation of the Catalyst

A hafnium metallocene of the formula $Et(Ind)_2HfCl_2$ was prepared by adding 38 mmol of n-butyllithium in hexane to a solution of 5 gm (19 mmol) of bisindenylethane in 150 ml of THF cooled to −91° C. The solution was warmed to 50° C., stirred for 3 hours, and then added dropwise to a $HfCl_4$/THF adduct solution (19 mmol in 150 ml of THF) at 150° C. After stirring overnight, the heat was removed and the solution was sparged for 15 seconds with HCl gas to produce a yellow solution. THF was roto-evaporated, and the solids were added to a small portion of $CH_2CL_2$. The solvent was decanted and the bright yellow solids were obtained by roto-evaporation and dried in vacuo. The yellow solids were dissolved in 100 cc of $CH_2Cl_2$ and the insoluble LiCl was filtered off. On addition of cold pentane, a few grams of bright yellow powder precipitated. The complex was filtered off, dried and further purified by fractional recrystallization from dry toluene at 0° C.

Polymerization of Propylene (Polymerization Procedure No. 1)

In a 75 ml stainless steel sample cylinder filled with argon, a catalyst solution containing 0.14 mg of $Et(Ind)_2HfCl_2$ and toluene was precontacted for 5 minutes with 10 ml of a solution of methylalumoxane in toluene. The contents of the sample cylinder were then injected by syringe into a 2 liter Zipperclave reactor followed by the addition of 1.0 liter of propylene to the reactor at 50° C. The temperature was maintained at the reaction temperature (shown as $T_r$ in Table 1) of 50° C. and the contents of the reactor were agitated for one hour. The propylene was then vented and the contents of the reactor were washed with 50% methanol in dilute HCl solution and dried in vacuo.

Analysis of Polymer

The polymer product was then analyzed for the melting points and molecular weights. The melting points $T_m$, as shown in Table 1 were derived from DSC (Differential Scanning Calorimetry) data as known in the art. The melting points are not true equilibrium melting points but are DSC peak temperatures. True equilibrium melting points would be higher than the DSC peak melting points. The melting points for polypropylenes are determined by the crystallinity of the isotactic fraction of the polymer. The results showed only a difference of 1°–2° C. in the melting points after most of the atactic polymer was removed and isotactic polymer remained. This is shown to be true by running the DSC melting points before and after removal of the xylene solubles or atactic form of the polymer. The predominantly isotactic polymer yields a sharper and more distinct melting point peak.

The molecular weights of the polymers were calculated using GPC (Gel Permeation Chromatography) analysis. The analysis was done on a Waters 150 C instrument with a column of Jordi gel. The solvent was trichlorobenzene and the operating temperature was 140° C. The values for $M_n$ and $M_w$ and $M_w/M_n$ are reported in Table 1.

EXAMPLE 2

The procedures of Example 1 were repeated except that 1.42 mg of catalyst was used and the reaction temperature was 80° C. The results are shown in Table 1.

COMPARATIVE EXAMPLES 3 and 4

The procedures of Example 1 were repeated except that a zirconium metallocene catalyst was used to compare the results obtained using the hafnium catalyst.

EAMPLES 5–7

The procedures of Example 1 were repeated except that the catalyst used was a hydrogenated form of the hafnium catalyst used in Example 1 with the structure Et(IndH4)2HfCl2 and Polymerization Procedure No. 2 was followed. This procedure differs from that in Example 1 (Procedure No. 1) in that the propylene was added to the reactor prior to the addition of the catalyst/cocatalyst mixture. The reaction temperatures were varied as shown in Table 1.

COMPARATIVE EXAMPLES 8-10

These examples parallel those of Examples 5-7 using similar procedures but using a zirconium catalyst of the formula Et(IndH4)2ZrCl2. The results are shown in Table 1. Comparing the results in Table 1, the hafnium metallocene catalyst of the present invention produces polymer products that exhibit much higher molecular weights than the corresponding zirconium metallocenes under similar conditions.

EXAMPLES 11-16, 20

The catalyst preparation procedures of Example 1 were repeated for Et(Ind)2HfCl2. Polymerization Procedure No. 3 was followed which is the same as Procedure No. 2 except that 500 ml of toluene and 800 ml. of propylene were added to the reactor and 200 ml of propylene were used to charge the catalyst/cocatalyst into the reactor. The other polymerization conditions were as listed in the Table.

merization temperature, the molecular weight of the polymer product is higher.

As part of the present invention, it was also discovered that using a mixture of alumoxane and trimethyl aluminum in the catalyst system causes a transformation of the catalyst over time. This transformation is exhibited in the Figure which shows the variation of the molecular weight distribution with time. In the Figure, curve "a" shows a typical molecular weight distribution for a polymer produced as in Examples 1-2. Curves "b–d" show the distribution at 0.5, 1, and 2 hours respectively of a similar catalyst system that contains trimethyl aluminum. These curves reflect a bi-modal distribution and a transformation from a predominantly high molecular weight polymer at 0.5 hours to a lower molecular weight polymer product after 2 hours.

Depending on the particular catalyst, trimethyl aluminum may be used in varying amounts in combination with alumoxane. Preferably, trimethyl aluminum is used in the amount of 0-20 mole percent of the mixture of alumoxane and trimethyl aluminum. For the results shown in the Figure, the system contained 1 mole of trimethyl aluminum to 16 mole of alumoxane. Having described a few embodiments of the present invention, it is understood that modifications and adaptations may be made without departing from the scope of the invention.

TABLE 1

| Example | Catalyst | Cat. mg | $T_r$ °C. | Poly. Procedure | Yield gms | Efficiency kg/g·cat·1 h | $T_m$ °C. | $M_n$/1000 | $M_w$/1000 | $M_w/M_n$ |
|---|---|---|---|---|---|---|---|---|---|---|
| 1 | Et(Ind)2HfCl2 | 0.14 | 50 | 1 | 2 | 13.9 | 134 | 64 | 273.0 | 4.2 |
| 2 | Et(Ind)2HfCl2 | 1.42 | 80 | 1 | 7 | 4.93 | 129 | 30 | 81 | 2.7 |
| 3 | Et(Ind)2ZrCl2 | 2.0 | 50 | 1 | 20 | 10.0 | 133 | 6.1 | 13.3 | 2.2 |
| 4 | Et(Ind)2ZrCl2 | 1.43 | 80 | 1 | 221 | 154.5 | 126 | 6.7 | 14 | 2.1 |
| 5 | Et(IndH4)2HfCl2 | 1.48 | 30 | 2 | 4 | 2.7 | 146 | 49 | 158 | 3.2 |
| 6 | Et(IndH4)2HfCl2 | 1.48 | 50 | 2 | 13 | 8.8 | 141 | 33 | 108 | 3.3 |
| 7 | Et(IndH4)2HfCl2 | 1.48 | 80 | 2 | 95 | 64.2 | 127 | 18 | 42 | 2.3 |
| 8 | Et(IndH4)2ZrCl2 | 19.6 | 20 | 1 | 17 | 0.8 | 143 | 9.7 | 28.0 | 2.9 |
| 9 | Et(IndH4)2ZrCl2 | 1.86 | 50 | 1 | 33 | 17.7 | 137 | 4.8 | 11 | 2.3 |
| 10 | Et(IndH4)2ZrCl2 | 3.38 | 80 | 1 | 265 | 78.4 | 121 | 3.2 | 5.6 | 1.8 |
| 11 | Et(Ind)2HfCl2 | 0.17 | 50 | 3 | 9.0 | 53 | 136 | 193 | 724 | 3.8 |
| 12 | Et(Ind)2HfCl2 | 0.17 | 50 | 3 | 4.6 | 27 | 137 | 272 | 605 | 2.2 |
| 13 | Et(Ind)2HfCl2 | 0.17 | 50 | 3 | 6.4 | 37 | 138 | 170 | 442 | 2.6 |
| 14 | Et(Ind)2HfCl2 | 1.70 | 50 | 3 | 220.0 | 129 | 133 | 58 | 228 | 3.9 |
| 15 | Et(Ind)2HfCl2 | 1.70 | 50 | 3 | 80.3 | 47 | 134 | 111 | 310 | 2.8 |
| 16 | Et(Ind)2HfCl2 | 1.70 | 50 | 3 | 76.0 | 45 | 136 | 152 | 361 | 2.4 |
| 17 | Et(Ind)2HfCl2 | 3.40 | 50 | 4 | 230.0 | 68 | 134 | 130 | 304 | 2.3 |
| 18 | Et(Ind)2HfCl2 | 3.30 | 50 | 4 | 190.0 | 58 | 135 | 73 | 271 | 3.7 |
| 19 | Et(Ind)2HfCl2 | 3.40 | 60 | 4 | 120.0 | 35 | 133 | 73 | 248 | 3.4 |
| 20 | Et(Ind)2HfCl2 | 1.71 | 40 | 3 | 22.6 | 13 | 135 | 180 | 431 | 2.4 |

EXAMPLES 17-19

In these Examples, Polymerization Procedure No. 4 was followed which procedure is identical to Procedure No. 3 except that 1000 ml of toluene and 1800 ml of propylene were added to a 4 liter reactor and 200 ml of propylene were used to charge the catalyst/cocatalyst solution to the reactor.

It was noticed that the hafnium catalysts used in Examples 1-2, 5-7, 11-14, and the example shown in the Figure were prepared using a HfCl4 solution that was only 98% pure and that it contained some Zr contaminants. The HfCl4 used to produce the hafnium catalysts of Examples 15-20 was 99.99% pure.

The results of Examples 11-20 show polymer products with very high molecular weights. The results also show a relation between the concentration of hafnium in the system and the molecular weight of the polymer product. Examples 19 and 20 show that at a lower poly-

I claim:

1. A catalyst for the polymerization and copolymerization of olefins comprising a an alumoxane and chiral, stereorigid hafnium metallocene catalyst described by the formula

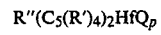

wherein (C5(R')4) is a cyclopentadienyl or substituted cyclopentadienyl ring; each R' is the same or different and is a hydrogen or a hydrocarbyl radical having from 1-20 carbon atoms; R" is a structural bridge between the two (C5(R')4) rings imparting stereorigidity to said catalyst and R" is selected from the group consisting of an alkylene radical having 1-4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; each Q is a hydrocarbyl radical having 1-20 carbon atoms or is a halogen; and $0 \leq P \leq 3$.

2. The catalyst of claim 1 wherein ($C_5(R')_4$) is an indenyl radical or a hydrated indenyl radical.

3. The catalyst of claim 1 wherein R" is an ethylene radical.

4. The catalyst of claim 1 wherein Q is chlorine.

5. The catalyst of claim 1 wherein p is 2.

6. The catalyst of claim 1 further comprising a solvent.

7. The catalyst of claim 6 wherein said solvent is selected from the group consisting of toluene, xylene and methylene chloride.

8. The catalyst of claim 1 wherein said alumoxane consists of about 0-20 mole percent of trimethylaluminum and 80-100 mole percent of alumoxane wherein the catalyst transforms over time and produces a polymer product with different characteristics than the product initially produced.

* * * * *